March 11, 1969     E. GUERRERO     3,432,120
AIRCRAFT
Filed May 20, 1966     Sheet 2 of 3
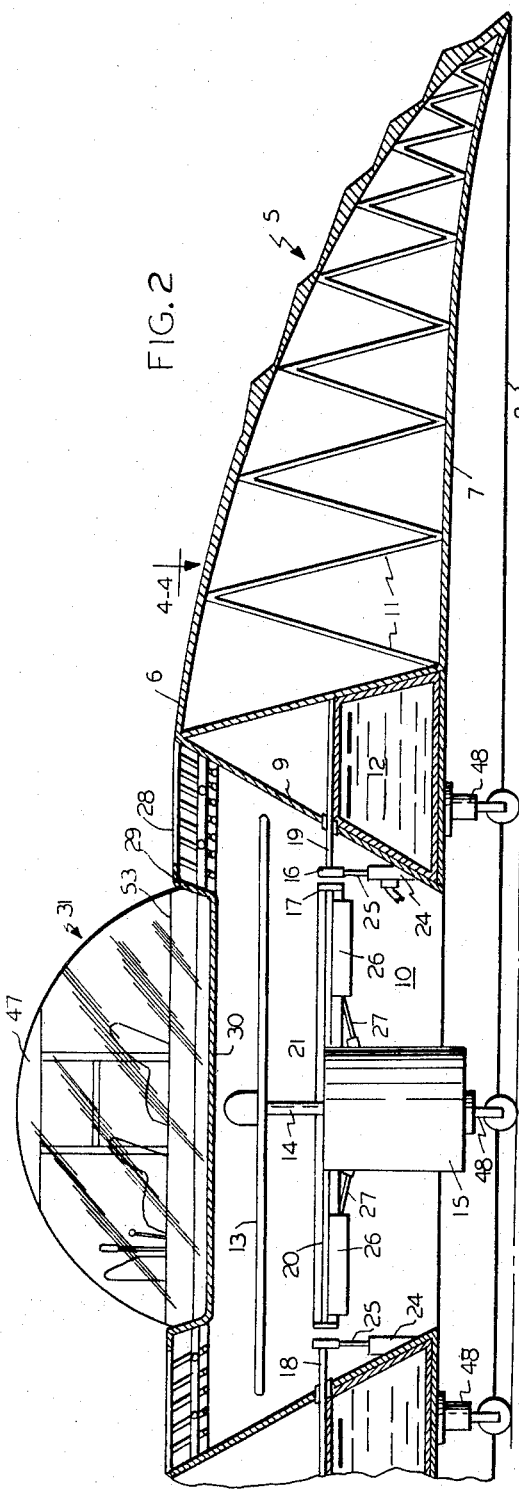
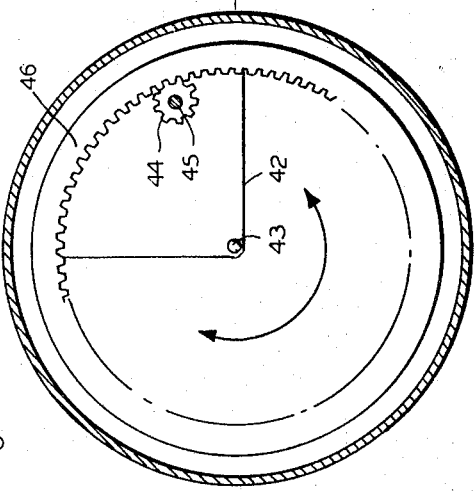
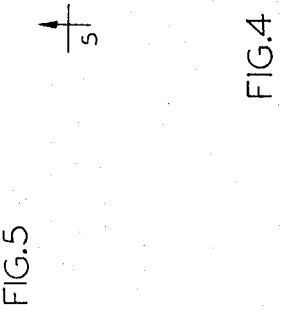
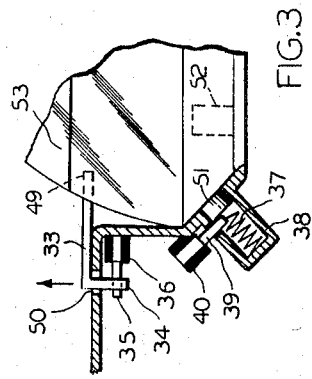
INVENTOR
EFRAIN GUERRERO
BY *Philpitt, Steininger & Priddy*
ATTORNEYS March 11, 1969  E. GUERRERO  3,432,120
AIRCRAFT Filed May 20, 1966  Sheet 3 of 3

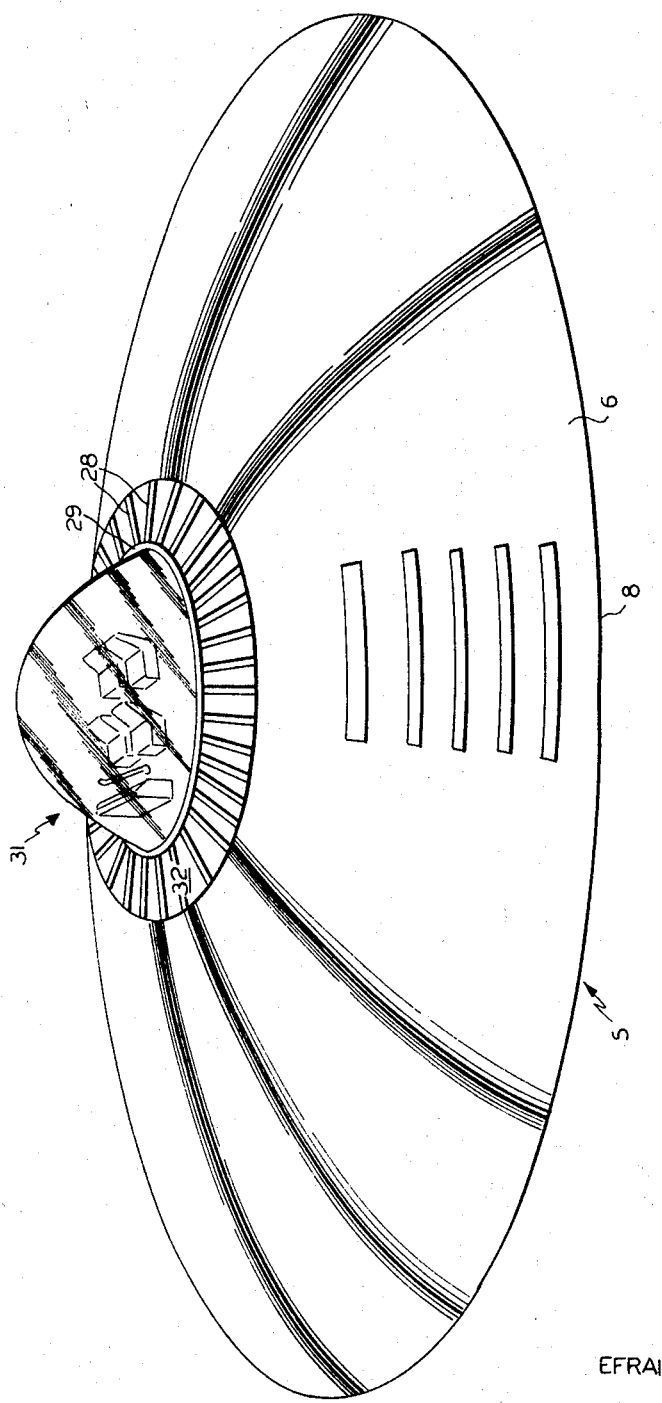

INVENTOR
EFRAIN GUERRERO

BY *Philpott, Steininger & Priddy*

ATTORNEYS

United States Patent Office 3,432,120
Patented Mar. 11, 1969

3,432,120
AIRCRAFT
Efrain Guerrero, Arlington, Va.
(901 20th St. NW., Washington, D.C. 20006)
Filed May 20, 1966, Ser. No. 551,656
U.S. Cl. 244—12                                       11 Claims
Int. Cl. B64c 29/00, 17/08

ABSTRACT OF THE DISCLOSURE

The specification discloses floatable aircraft with an annular wing and an air duct mounted within the wing. The impeller, control surfaces, and motor are gimbal mounted in the air duct to provide directional movement for the aircraft. Weight sensing means are mounted on the ground engaging members to sense the load on each ground engaging member and the total weight of the aircraft. The weight distribution may then be calculated and a shiftable ballasting member is rotated to dynamically balance the aircraft.

---

This invention relates to aircraft. More particularly, it pertains to aircraft safety systems and an improved aircraft embodying such systems.

This invention relates to an aircraft suitable for use as an all-around personnel transportation vehicle by a large proportion of the population and therefore it must satisfy a wide variety of critical requirements. Such aircraft must be as simple as possible from the standpoint of construction and maintenance, since complexity leads to expense, and expense has been an important deterrent to the development of general aviation. Such aircraft must have VTOL capability for practical utility. The aircraft should be able to operate from land, and, at least land and float upon the water, in order to permit an emergency landing virtually anywhere. It should be able to bring its occupants from cruising altitude to a safe landing in the event of a full or partial power failure. It should not have exposed moving parts such as propellers or rotors which would be hazardous to personnel who are near the vehicle when it is landing, taking off or operating on or near the ground.

It will be appreciated that certain of the above requirements are met by helicopters, which have VTOL capabilities and are able to descend from cruising altitude in the event of a power failure, provided the structural integrity of the main rotor and its ability to rotate freely are not impaired. Nevertheless, the helicopter has not yet demonstrated its feasibility as a practical all-around means of transportation for large proportions of the population. Cost is perhaps the principal deterrent factor at present, since the acquisition and operating costs of helicopters are at present substantially greater than those of fixed-wing aircraft of equivalent weight-carrying capacity. Even if acquisition costs could be reduced by increases in volume of production, the helicopter still suffers from the disadvantages of having high maintenance costs, exposed rotors, and inability to make a safe descent upon impairment of the rotor or its ability to turn (e.g. through gear box failure).

Recently, new types of circular wing aircraft have been proposed. According to one suggestion found in the art, a circular wing aircraft is provided with a vertically oriented central opening or duct through the wing. A power plant with a downwardly thrusting impeller, e.g. contra-rotating props, is gimballed in the duct to provide lift and at least a measure of lateral control. Such aircraft can be made with VTOL capability and the capability of producing at least some lift by autorotation of the props in case of power failure. They have the further inherent virtue of having semi-enclosed props as opposed to the completely exposed rotors of helicopters. The present invention pertains to improvements in aircraft generally, and to improvements in circular wing aircraft of the general type just described.

The invention may be better understood by referring to the accompanying drawings in which like reference numerals refer to like parts throughout the several views, and in which:

FIGURE 1 is a perspective view of an aircraft constructed in accordance with the invention.

FIGURE 2 is a partial, vertical sectional view of the aircraft of FIGURE 1.

FIGURE 3 is an enlarged portion of FIGURE 2.

FIGURE 4 is a sectional vew of the lower portion of the passenger compartment taken along section line 4—4 in FIGURE 2.

FIGURE 4 is a sectional view taken along section line 5—5 in FIGURE 4.

Figure 6:
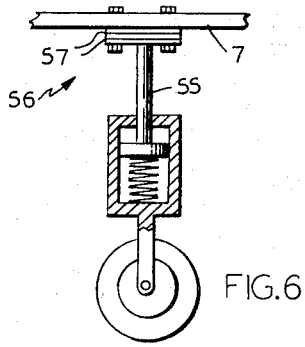
FIGURE 6 is an enlarged detail view of a weight-determining landing gear assembly for an aircraft.

In a preferred embodiment of the invention, the aircraft includes, as disclosed in FIGURES 1 and 2, an annular wing 5 having upper and lower walls 6 and 7, both of which are transversely curved downwardly and joined together, as at 8, at the outer periphery of the wing. The inner ends of the upper and lower walls are joined together by a circular downwardly, inwardly inclined wall 9 forming an air duct 10 in the center of the wing. The skin of the wing may be any suitable synthetic resinous or elastomeric material supported by a series of struts 11 formed of fiber-glass reinforced resin or light metal and extending in a zig-zag course between the upper and lower walls of the wing. Disposed within the wing around the duct 10 is an annular tank 12 for storage of the fuel supply. An impeller 13 is disposed in the upper end of the duct 10 for creating a downward flow of air through the duct, the impeller being mounted on the upper end of the shaft 14 of a motor 15. The motor is supported by a pair of gimbal rings 16 and 17 disposed in concentric relation, the outer ring 16 being pivotally mounted on shafts 18 and 19 projecting from opposite sides of the wall of the duct while the inner ring 17 is pivotaly mounted on shafts (not shown) connected to the outer ring and with their axis disposed at right angles to the axis shafts 18 and 19. Hydraulic cylinders 24 are mounted on the wall 9 beneath the ring 16 adjacent the pivotal mountings of the rings having rods 25 in contact with the lower edges of the ring adjacent their pivotal mountings. The hydraulic cylinders are used to adjust the degree of tilt between the outer ring and the aircraft, thus serving to control aircraft roll. A second set of hydraulic cylinders (not shown) are mounted on the outer gimbal ring near the shafts which attach it to the inner ring, for tilting the one ring with respect to the other and therefore controlling aircraft pitch. Yaw control is provided by a plurality of generally upright control surfaces 26, pivotally supported on generally radial shafts 20 and 21 extending from the motor to the inner gimbal ring 17. By means of suitable operating linkage 27, the control surfaces are caused to pivot to any desired position about shafts 20 and 21, thus controlling (e.g., preventing and/or imparting any desired degree of) rotational movement on the part of the aircraft. In the preferred embodiment of the aircraft wherein a single rotating impeller is used, these control surfaces also counteract the torque generated by a single propeller, thus making it unnecessary to provide two propellers rotating at different speeds.

A plate 29, supported by radial bars 28 extending outwardly to the wing at the top edge of duct 10, partially covers the upper end of the duct 10 and has a depressed central recess 30 which serves as a receptacle for a detachable dome-shaped cabin 31 of air-tight construction. The bars form a grill 32 to allow air to enter the duct. As shown in FIGURE 3, the cabin is detachably held in the recess by arms 33 anchored to the cabin 31 at their inner ends 49 and extending over the rim of the recess 30 and having depending apertured ends 34 extending through openings 50 in the plate 29, beneath which they engage a latch bolt 35 adapted to be withdrawn from engagement by a solenoid 36. Around the bottom of the recess 30 are a series of ejector springs 37 mounted in cylinders 38. The springs are normally held compressed by plungers 39, which extend through the walls of the cylinders and are adapted to be retracted from such engagement by solenoids 40. Upon retraction of the plungers 39, the springs 37 expand and press outwardly against followers 51 to eject the cabin from the recess. A plurality of electrically-fired, solid fuel thrusters 52 may be provided to assist in cabin ejection. A parachute is mounted in a compartment 47 in the top of the cabin 31 and means may be provided for opening the parachute when the cabin is detached for an emergency landing. The aforementioned solenoids, thrusters and parachute opening means may all be controlled by a single "eject" button on the pilot's instrument panel 54.

A compartment 41 is disposed in the bottom of the cabin 31, beneath the floor 53, as shown in FIGURES 2-5. It contains a ballasting member 42 pivotally mounted to swing around a vertical shaft or axis 43 disposed centrally in the compartment. The rotation of the ballasting member may be accomplished and controlled by gear wheel 44 which may be rotated in a fixed position by a shaft 45 controlled from the passenger compartment. Gear wheel 44 meshes with a ring gear 46 fixedly attached to ballasting member 42 and adapted to rotate therewith about shaft or axis 43. Thus, by rotating shaft 45, the pilot may rotate the ballasting member 42 to any desired position to compensate for imbalance in the weight distribution of the aircraft or its load. The ballasting member may be a dead weight, or more desirably, a compartment or a carrier means for luggage, fuel or other objects having appreciable weight. An access hatch may be provided through floor 53 if needed.

The aircraft is supported on the ground by four ground-engaging members provided with weight-sensing means and thereby constituting a weight-measuring landing gear assembly which may, if desired be adapted to measure total weight of the aircraft or weight distribution, or both, preferably the latter. Over-loading of an aircraft can result in dangerous effects on controllability. Also, controllability may be seriously affected by improper weight distribution. At present, proper loading is determined by determining the weight of each object which has been loaded in the aircraft and its position in respect to a specified datum position. These quantities are then employed in calculations which yield the moment arm of each of the objects in the aircraft, and the total obtained by summing the resultant moment arms is compared with a graph which shows the acceptable center of gravity envelope for the aircraft. The repetitious performance of such calculations on the loading of an aircraft that is being used for frequent, miscellaneous short-haul trips at different loadings is a burdensome process, thus tempting the pilot to rely on estimates or to neglect the calculations altogether. The weight measuring landing gear of the present invention which is useful not only with the aircraft disclosed herein, but also with other types of aircraft, e.g. fixed and rotary wing types and other circular wing aircraft, solves the foregoing problem by providing a rapid, accurate means of determining loading and weight distribution without calculations.

Figure 7:
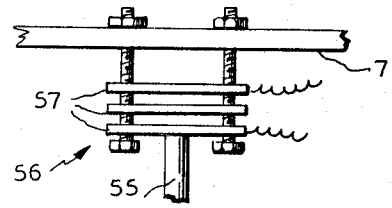
FIGURE 7 is a partial, exploded view of the landing gear assembly of FIGURE 6.
Figure 8:
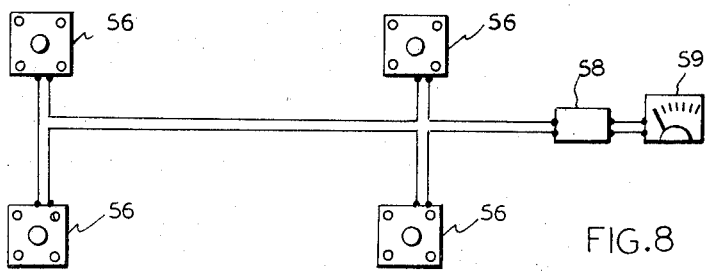
FIGURES 8 and 9 are schematic diagrams of weight-distribution sensing systems adapted for connection with the landing gear assembly of FIGURES 6 and 7.

In accordance with one embodiment shown in FIGURES 6-8; a plurality of ground engaging members 48, including wheel and shock absorber-mounting struts 55, are connected to the lower surface 7 of the aircraft through transducers 56 having pressure and contact plates 57. Each transducer measures a portion of the total weight of the aircraft. The transducers are connected in series to an amplifier 58 for totalizing the weight units measured by the individual transducers and for showing the total weight thus measured on an indicating means, such as a meter 59, digital reader, or "go-no-go" lights on the pilot's instrument panel.

Figure 9:
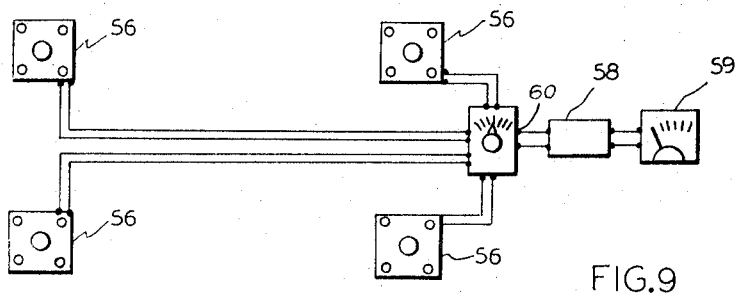

In accordance with a more preferred embodiment illustrated in FIGURE 9, the transducers are not connected in series with one another, but rather are individually connected to switching means 60. The switching means is connected to the amplifier 58. In all other respects, the system is like the one just described. The switching means is provided with a plurality of positions, which may, for convenience, be referred to as positions (a), (b), (c), (d), (e) and (f). In position (a), all transducers are connected in series with one another and with the amplifier input, so that the indicating means, which may in this case be a digital reader or meter-type indicator 59 "reads" the total weight of the aircraft. When the switching means is in position (b), all of the transducers are connected in parallel with the amplifier input, so that the indicating means 59 registers the average load on the ground engaging members 48. In positions (c), (d), (e) and (f), the first, second, third and fourth transducer 56, respectively, are individually connected with the amplifier input, and the indicating means 59 will, in each position, indicate the actual load on each ground engaging member 48. If the indicating means is of the meter type, it may be provided with a manually resettable set-pointer (like the manually resettable hand on a common household barometer). The set-pointer is positioned over the indicating needle of the meter with the switch in position (b). Then, as the switching means is moved through positions (c), (d), (e) and (f), the deflection of the needle from its original position may, in each case, be noted. The deflection or deviation furnishes an indication of the imbalance, if any, in the loading of the aircraft. The amount of deviation noted as the switching means is adjusted may be compared with predetermined values shown on the dial face or elsewhere, which represent the maximum deviation which may be tolerated without producing unstable flight characteristics. If the deviation is found excessive in any of the positions (c), (d), (e) and (f), the position of the ballasting member is shifted as necessary to reduce the aforesaid deviations as much as possible. If the shifting of the balancing member is not effective to reduce all deviations, both positive and negative, to acceptably low values, the pilot knows that he may not take off without altering the loading of the aircraft.

The foregoing embodiment of a weight-measuring and distribution-checking system is only illustrative of a wide variety of laternative embodiments that fall within the spirit of the invention. For instance, in a more sophisticated system, the entire switching and deviation-checking function could be performed automatically by a rudimentary computer with an interconnection to the power plant to prevent application of take-off power in the case of an over-load or dangerously imbalanced load. Also, the ground engaging members need not necessarily be wheeled.

Figure 10:
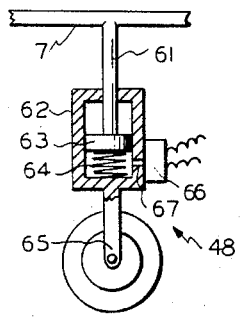
FIGURE 10 is a schematic diagram of an alternate form of weight-determining landing gear assembly.

The pressure and contact plate transducers 56 of FIGURES 6-9 are only exemplary of a wide variety of transducers that could be employed. For instance, where the aircraft has ground engaging members which include hydraulic shock absorbers or oleo struts through which the weight on each ground engaging member is transmitted to the ground, an electrical hydraulic pressure sensing device may be mounted on the shock absorber in communication with the reservoir of fluid within. For instance, the aircraft may be supported on the ground by four ground-engaging members 48, each of which (FIGURE 10) includes a leg 61 depending from the lower surface 7 of the wing adjacent its inner periphery in spaced relation with one another. The legs are slidably mounted in hydraulic cylinders 62 and have pistons 63 at their upper end in engagement with shock absorbing springs 64 disposed in the cylinders 62. Attached to the lower ends of the cylinders are casters 65. The weight on each leg will create a hydraulic pressure in a hydraulic fluid maintained in the cylinders 62 and transmitted to pressure sensor 66 via an aperture in the cylinder wall. An electrical signal from pressure sensor 66 may be transmitted to weight and balance indicator instrument 59 in the cabin in the same manner as from transducers 56 of FIGURE 9, so the pilot can easily determine if there is a dangerously unequal distribution of the weight on the casters.

While systems involving electrical transmission of data to the pilot's instrument panel are highly convenient, electrical means are not essential. For instance, a pressure line from each shock-absorber can be run to the pilot's control panel and connected to its own individual gauge, so that the pilot can visually note the differences in the readings among the gauges. The gauges may, if desired, have their dials marked with red and green sectors to indicate safe and unsafe conditions of loading and balance.

From the foregoing description, it is apparent that the present invention provides improvements in aircraft which render same safer and more convenient to use. The invention provides a circular wing aircraft which is symmetrically designed, has a simplified control system, is capable of vertical take off and landing, is relatively inexpensive to construct because of the very high degree of standardization of structural components which may be attained in the circular wing, and is capable of riding on a cushion of air close to the ground, thus capitalizing on the "ground effect" as a result of the dependent peripheral portions of the wing. When the wing is of waterproof construction, which is preferred, the aircraft may be operated to and from the water's surface, since a substantial portion of the volume of the wing is below the top of the engine housing, thus insuring that the engine will not be completely submerged when the aircraft is afloat. This facilitates the supplying of combustion air to the engine with reduced danger of water ingestion. Moreover, the present invention provides an aircraft weight and balance measuring system useful in circular wing and many diverse types of aircraft, which system makes it possible for a pilot to determine the loading and balance of his aircraft by means of instruments. When such a weight and balancing system is provided in an aircraft in conjunction with a shiftable ballasting member, it is possible for the pilot to manipulate the ballasting member and, possibly, to alleviate improper balancing of the aricraft without handling objects or reloading the aircraft. While it could be possible to provide an aircraft of any description with either a shiftable ballasting member, or a weight and balance determining system alone, it is apparent that special advantages flow from providing both, and the provision of both is therefore, a definitely superior arrangement.

What is claimed is:

1. An aircraft, comprising; a floatable, watertight annular wing having upper and lower walls traversely curved downwardly and joined with one another at their downwardly projecting peripheries; a vertically disposed duct disposed in the center of the annular wing; motor means, impeller means, and control surface means mounted on gimbals within said duct, said control means mounted adjacent said impeller means to control the rotation of air in said duct about the generally vertical axis thereof; and a cabin mounted atop said wing over said duct and surrounded by passages for the entry of air into said duct.

2. An aircraft in accordance with claim 1 wherein said cabin is ejectable and is provided with self-contained parachute operable upon ejection of said cabin from said aircraft.

3. An aircraft in accordance with claim 1 wherein said wing walls have a skin of synthetic resinous or elastomeric material supported from within said wing by a skeletal framework of structural members.

4. An aircraft in accordance with claim 3 wherein said structural members are of fiber-glass reinforced plastic.

5. An aircraft in accordance with claim 1 wherein said aircraft comprises a shiftable ballasting member.

6. An aircraft in accordance with claim 1 wherein said aircraft is provided with a plurality of ground engaging members and sensing means for sensing the weight exerted on said ground engaging members by said aircraft.

7. An aircraft in accordance with claim 6 wherein said aircraft comprises a shiftable ballasting member.

8. An aircraft in accordance with claim 7, wherein said sensing means are connected with weight indicating means in the cabin and control means for controlling the shifting of said ballasting member are also provided in said cabin and connected with said ballasting member.

9. An aircraft in accordance with claim 6 wherein said sensing means are connected with means for detecting the total weight of the aircraft and for determining whether said load is in balance.

10. An aircraft in accordance with claim 1 wherein said impeller means further comprise a single propeller and means for counteracting the torque of said propeller.

11. An aircraft having a ballasting apparatus comprising: an airframe; a baggage compartment mounted within said airframe to rotate in an arcuate path about an axis, said axis being disposed at the center of gravity for said aircraft, said compartment being adapted to receive baggage and other freight carried by the aircraft; transmission means mounted within said airframe to rotate said baggage compartment about its axis, whereby the roation of said ballasting means about its axis changes the effective center of gravity for the aircraft.

References Cited

UNITED STATES PATENTS

| | | | |
|---|---|---|---|
| 1,730,941 | 10/1929 | Myers | 114—124 |
| 2,585,480 | 2/1952 | Makhonine | 244—93 |
| 2,615,330 | 10/1952 | Blackmon et al. | 177—136 X |
| 2,807,428 | 9/1957 | Wibault | 244—23 |
| 2,935,275 | 5/1960 | Grayson | 244—23 |
| 2,953,320 | 9/1960 | Parry | 244—12 |
| 2,969,032 | 1/1961 | Pinnes | 244—23 X |
| 2,963,245 | 12/1960 | Bolton | 244—93 |
| 3,193,214 | 7/1965 | Hollingsworth | 244—12 |
| 3,321,035 | 5/1967 | Tarpley | 177—136 |

FERGUS S. MIDDLETON, *Primary Examiner.*

THOMAS W. BUCKMAN, *Assistant Examiner.*

U.S. Cl. X.R.

244—93; 114—124; 177—136